May 2, 1967 — S. J. WARREN — 3,317,416
ELECTROLYTIC MACHINING WHEEL
Filed April 14, 1964 — 2 Sheets-Sheet 1

INVENTOR
Stanley J. Warren
ATTORNEYS

May 2, 1967  S. J. WARREN  3,317,416
ELECTROLYTIC MACHINING WHEEL
Filed April 14, 1964  2 Sheets-Sheet 2

INVENTOR
Stanley J. Warren
BY
ATTORNEYS

United States Patent Office 3,317,416
Patented May 2, 1967

3,317,416
ELECTROLYTIC MACHINING WHEEL
Stanley J. Warren, Teaneck, N.J., assignor to
Anton Smith & Co., Inc.
Filed Apr. 14, 1964, Ser. No. 359,652
6 Claims. (Cl. 204—290)

This invention is for an improvement in electrode wheels for use in electrolytic machining or shaping. It is directed more particularly to the provision of a metal bonded diamond-grit wheel of improved construction and of light weight.

The art of the electrolytic machining or shaping involves removing portions of a workpiece by electrochemical deplating. It is particularly useful in machining hard materials, such as tungsten carbide, having the advantage of small wheel wear and low heating. Broadly, the machining is carried out by making the workpiece positively charged (anode) and the grinding wheel negatively charged (cathode) in a low-voltage direct current electrical circuit, the electrolyte being sprayed therebetween. In this manner the shaping of the workpiece is done principally by "deplating," while the diamond-grit particles embedded in the working surface of the wheel serve to prevent direct metallic contact between the workpiece and the metal of the wheel, while serving to dress the workpiece.

Heretofore, in electrolytic machining it has been customary to employ wheels made entirely of metal and having the working surface thereof containing the diamond-grit material, mounted upon the metal wheel. While such construction has proved generally satisfactory, nevertheless certain disadvantages exist. For example, metal wheels are heavy and thus the diameter or rotational speed, or both, of the wheel are limited. Further, because the entire wheel is conductive, current flow between the workpiece and the wheel tends to flow in undesired paths, particularly when the electrolyte splashes on the turning wheel. Minute metallic particles of deplated workpiece material mixed with the electrolyte may also create undesired current flow between the workpiece and the wholly metal portions of the wheel thus producing non-uniform deplating. An additional problem arising with wholly metal wheels is the incompatability of the metal in which the diamond-grit is embedded with the metal of the supporting wheel. Where such metal-to-metal compatability does not exist, bonding of the diamond-grit working surface to the wheel may be difficult.

This invention overcomes the limitations found in conventional diamond-grit electrolytic machining wheels. In accordance with the invention the supporting wheel is made of a lightweight insulating material such as a synthetic resin (e.g., Bakelite) which is lighter than a solid metal wheel of iron, steel or brass, of comparable size. The conductive members leading from the metal embedded diamond-grit working surface to the metal hub, are protected by the dielectric material of the support wheel. In this way the current flow is confined to the conductive members. The wheel is of simple construction and is preferably mounted upon a conductive rotatable spindle which is made a part of the electrical circuit. So mounted, the need for slip rings, brushes and like upon or in contact with the wheel is obviated.

Broadly, the invention is for a machining wheel for use in an electrolytic machining apparatus having an electric circuit including a metallic workpiece to be machined, a liquid electrolyte, the machining wheel and a direct current voltage source. The machining wheel comprises an electrically conductive metal bonded diamond-grit working member and an electrically conductive metal hub adapted to be mounted upon a spindle for rotation. A plurality of electrically conductive metal spokes are bonded to and extend from the hub. Each of the spokes are bonded to the working member at one end and provide an electrical connection between the member and the hub at the other end. A disc-like member of dielectric material is integrally mounted at its inner diameter on the hub for rotation with the hub and the working member is integrally mounted upon the disc-like member at its outer diameter for rotation therewith. The disc-like member surrounds the spokes and provides electrical insulation and mechanical shielding of the spokes from the liquid electrolyte.

A clear understanding of the invention will be had by reference to the drawings which illustrate a preferred embodiment of the invention.

Figure 1:
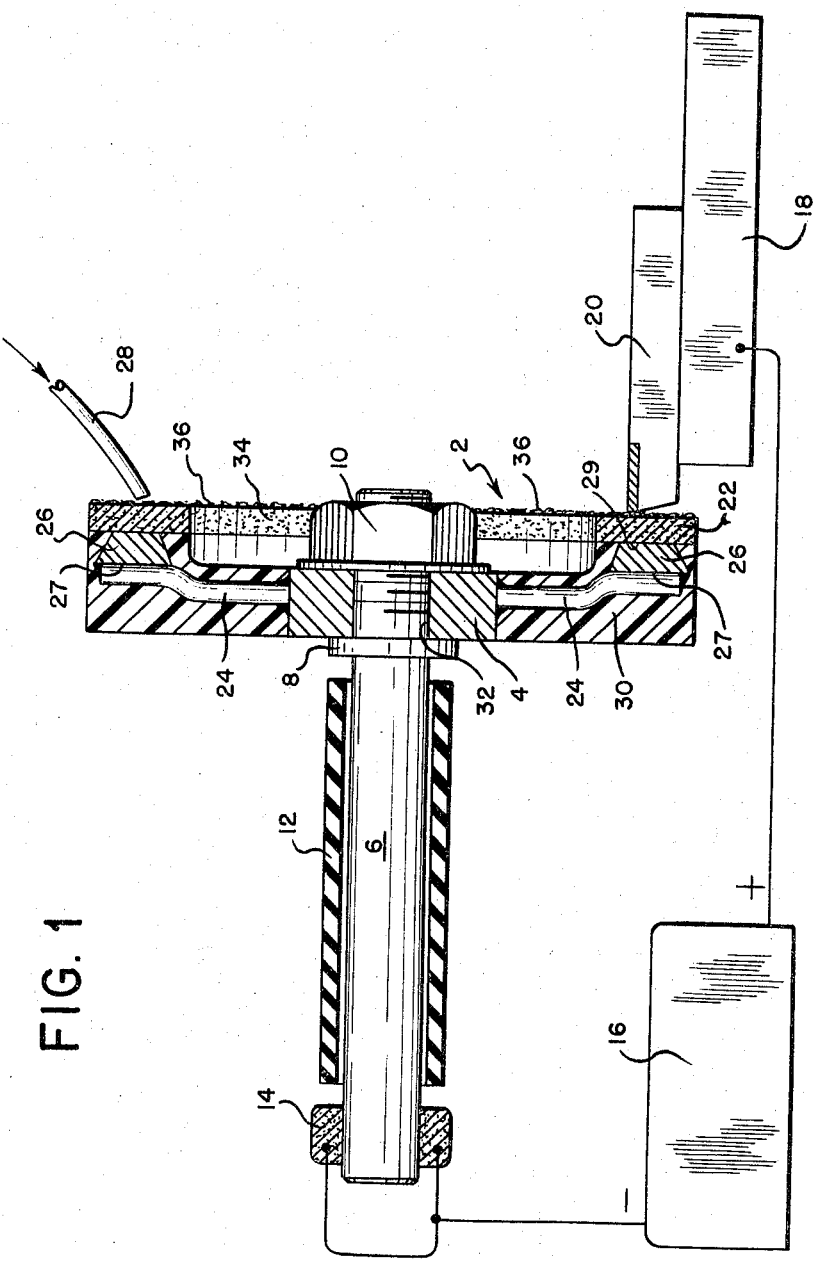
FIGURE 1 is a schematic of an electrolytic machining apparatus showing the novel electrolytic machining wheel in operative position.

Referring to FIG. 1 there is shown the electrolytic machining wheel 2 having a metallic hub 4 mounted upon one end of a rotatable spindle 6. The machining wheel 2 is preferably held in position against a collar 8 by a nut 10 tightened upon the spindle end, which is threaded. The spindle 6 may be rotated by suitable means such as a variable speed electric motor (not shown). The spindle 6, made of conductive material such as steel, is mounted for rotation in an insulated sleeve bushing 12.

At the opposite end of the spindle 6 are brushes 14 which engage the spindle 6 in electrical contact so that an electric current may flow between the brushes 14 and the spindle 6 during rotation. The brushes 14 are electrically connected to the negative terminal (cathode) of a source of direct current voltage 16 such as a battery. The voltage supplied by the electrical source 16 is preferably of about 28–30 volts D.C.

The positive terminal (anode) of the source 16 is electrically connected to a metallic support 18 for mounting the metallic workpiece 20 in operative relationship with the working member 22 of the machining wheel 2. The support 18 is preferably moveable from side to side and back and forth during the machining operation to aid in the shaping of the workpiece 20 and to avoid excessive wear upon one portion of the working member 22. The support 18 is also of conductive material so that the workpiece 20 may be maintained at a desired potential.

The working member 22 of the machining wheel 2 is in electrical connection with the hub 4 via the spokes 24 and conductive inset 26. The electrical circuit is completed when a liquid electrolyte is directed upon the frontal surface of the working member 22 via a tube 28.

The machining wheel 2 comprises a disc-like dielectric resin member 30, preferably Bakelite, having the conductive members of the wheel 2 integrally molded therein. In manufacturing the machining wheel 2, all the conductive members, namely, the hub 4, the spokes 24, the inset 26 and the working member 22 are first assembled, by brazing or soldering, with the hub 4 at the center and the radially extending spokes 24 supporting the ring-like working member 22 and inset 26 at the periphery. The members thus assembled are then placed in a mold and integrally molded with the dielectric material of the disc-like member 30, the hub 4 at its inner diameter and the working member 22 at its outer diameter. It can thus be seen that those conductive members in circuit between the working member 22 and the hub 4 are completely insulated by the member 30.

Figure 2:
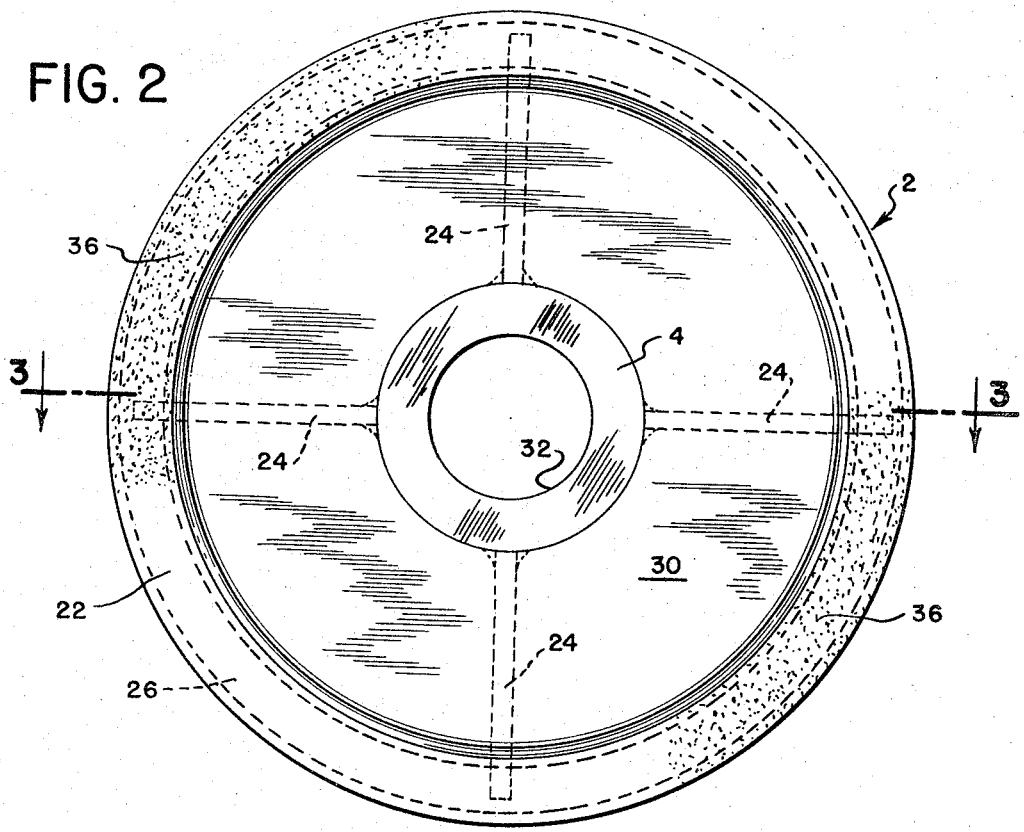
FIGURE 2 is a plan view of the electrolytic machining wheel.
Figure 3:
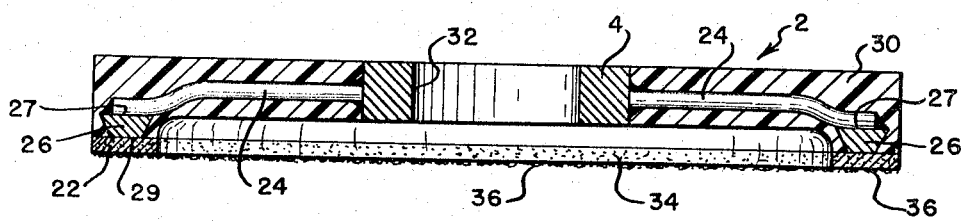
FIGURE 3 is a section taken along 2—2 of the wheel of FIGURE 2.

Referring especially to FIGS. 2 and 3, the detailed structure of the machining wheel 2 is as follows.

The central member of the wheel 2 is the metallic hub 4. The hub 4 is preferably fabricated of an alloy, such as Monel metal, to provide good electrical conductivity together with high corrosion resistance. The hub 4 is adapted to be mounted upon the spindle 6 for rotation therewith. Further, the dimension of the opening 32 in the hub 4 is such as to insure continuous electrical connection with the spindle 6.

A plurality (preferably four) of electrically conductive metal spokes 24 are bonded to the periphery of the hub 4 and extend radially therefrom. The spokes 24 are preferably made from an alloy of aluminum, tungsten carbide, silver, copper and manganese. The inner ends of the spokes 24 are brazed or soldered to the hub 4 to provide a sound electrical connection therewith. The outer ends of the spokes 24 are brazed or soldered to the back portion 27 of the inset 26 which in turn is bonded in electrical connection at its front portion 29 with the working member 22. The spokes 24 act primarily as an electrical connection between the hub 4 and the working member 22 but also contribute structurally to the wheel assembly.

The working member 22 and the inset 26 are properly discussed together. While in the preferred embodiment of the invention the working member 22 and the inset 26 are separate elements, they need not be; they might well be an integral unit and thus together comprise the working member. For example, the inset 26 could be machined from or formed initially as part of the matrix 34. In such case the inset 26 would be a portion of the matrix 34.

The working member 22 comprises a sintered metal matrix 34 and granules of bort 36 (diamond grit particles) partially embedded in the frontal working surface. In fabricating the working member 22, powdered metal, such as bronze, is bonded together with the bort 36. Although a number of steps are involved in the powder metallurgy process used to form the matrix 34 it may be described generally as bonding particles of metal together by compacting them under heat and pressure. The temperatures are below the melting point so that there is no liquification of the metal. The advantage of such a process in fashioning the working member 22 is that the bort 36 may be more accurately located at the working surface rather than permitted to disperse at random through the matrix as would be the case were conventional molding used.

The bort 36 functions principally to keep the workpiece 20 out of direct electrical contact with the metal matrix 34 of the working member 22. Numerous cavities or spaces are formed between the granules of bort 36 and in the pores of the sintered matrix 34 in which the liquid electrolyte may be trapped. As noted above it is the liquid electrolyte which completes the circuit between the workpiece 20 and the working member 22 or, more accurately, the matrix 34 of the working member. The deplating of the workpiece 20 takes place through the presence of the electrolyte. Only in a secondary sense does the bort 34 act as an abrasive.

The inset 26 is also fabricated of the same metal and in the same way as the matrix 34. Preferably the inset 26 has a configuration which in cross section is trapezoidal and is wider at the back portion 27. The narrower front portion 29 is bonded to the back of the matrix 34 of the working member 22. The trapezoidal configuration of the inset 26 and its orientation within the disc 30 prevents axial movement of the inset 26. Thus, in the finished wheel, the working member 22, having been first bonded to the inset 26 as described above, is in mechanically strong connection with the dielectric disc member 30.

By integrally molding the working member 22 at the outer diameter of the disc-like dielectric member 30, the problem of metal-to-metal compatability in securing the working member 22 to the wheel is substantially overcome. No question of compatability arises as between the matrix 34 and the inset 26 because they are of the same metal. No problem of compatability in a mechanical sense is present between the metal of the inset 26 and the spoke 24 because the mechanical stresses are taken up by the joint comprising the inset, the working member 22 and the dielectric disc 30. This is in contrast to conventional wheels where the differences in the composition of the metals comprising the wheel and those comprising the working member require the careful selection of a bonding agent which is both electrically conductive and mechanically sound.

It can be seen from the foregoing description that a number of advantages accrue from the use of a machining wheel constructed in accordance with the invention. The machining wheel being substantially constructed of a synthetic resin material is substantially lighter than comparable metal wheels and, therefore, larger wheels or faster rotational speeds may be used. Because of the insulating properties of the dielectric synthetic resin material forming a portion of the wheel, current flow between the workpiece and the working member is concentrated in the operative area of the working member. The arrangement of the hub and the spokes connected thereto confines the passage of current to the insulated conductive members and prevents any undesired peripheral currents from being created. There are no slip rings, brushes or other devices having electrical contact sufaces which might become fouled by excess electrolyte or particles cast off from the workpiece or the working member.

While the invention has been particularly shown and described with reference to a preferred embodiment thereof, it will be understood by those skilled in the art that variations in form and details may be made therein without departing from the spirit and scope of the invention. For example, the disc-like member may be formed of any number of synthetic resin materials which are light in weight, structurally strong, and have good electrical insulating properties. The working member might well be located upon the periphery of the wheel rather than at an outer diameter thereof. Further, the number of spokes and their particular orientation might be varied.

I claim:
1. A machining wheel for use in an electrolytic machining apparatus having an electric circuit including a metallic workpiece to be machined, a liquid electrolyte, the machining wheel and a direct current voltage source, said machining wheel comprising
   (a) an electrically conductive metal bonded diamond-grit working member,
   (b) an electrically conductive metal hub adapted to be mounted upon a spindle for rotation therewith,
   (c) a plurality of electrically conductive metal spokes bonded to and extending from said hub,
   (d) each of said spokes being bonded to said working member at one end and providing electrical connection between said hub and said member at the outer end,
   (e) a disc-like member of dielectric material integrally mounted at its inner diameter on said hub for rotation with the hub,
   (f) said working member being integrally mounted upon said disc-like member at its outer diameter for rotation therewith,
   (g) said disc-like member surrounding said spokes and providing electrical insulation and mechanical shielding thereof from the liquid electrolyte.

2. A machining wheel for use in an electrolytic machining apparatus having an electric circuit including a metallic workpiece to be machined, a liquid electrolyte, the machining wheel, a metallic spindle and a direct current voltage source, said machining wheel comprising
   (a) an electrically conductive working member comprising a sintered metal matrix and diamond grit particles partially embedded in the working surface, (b) an electrically conductive metal hub adapted to be mounted upon said spindle for rotation and in electrical connection therewith, (c) a plurality of electrically conductive metal spokes bonded to and extending from said hub, (d) each of said spokes being bonded to the metal matrix of said working member at one end and providing electrical connection between said hub and said working member at the other end, (e) a disc-like member of dielectric material integrally molded at its inner diameter on said hub for rotation with the hub, (f) said working member being integrally molded upon said disc-like member at its outer diameter for rotation therewith, (g) said disc-like member surrounding said spokes and providing electrical insulation and mechanical shielding thereof from the liquid electrolyte.

3. A machining wheel for use in an electrolytic machining apparatus having an electrical circuit including a metallic workpiece to be machined, a liquid electrolyte, the machining wheel, a metallic spindle and a direct current voltage source, said machining wheel comprising (a) a disc formed substantially of a dielectric synthetic resin material, (b) an electrically conductive metal hub integrally molded with said disc and adapted to be mounted in electrical connection with said spindle for rotation therewith, (c) a plurality of electrically conductive metal spokes integrally molded within said disc and bonded at one end to said hub and extending radially therefrom, and (d) an electrically conductive working member integrally molded upon the outer diameter of said disc and bonded to the outer ends of said spokes, said working member comprising (i) a matrix of sintered metal,
   (ii) diamond grit particles partially embedded in the working surface of said matrix, and
   (iii) a sintered metal inset portion of trapezoidal cross section wider at its back portion.

4. A machining wheel for use in an electrolytic machining apparatus having an electrical circuit including a metallic workpiece to be machined, a liquid electrolyte, the machining wheel, a metallic spindle and a direct current voltage source, said machining wheel comprising (a) a disc formed substantially of a dielectric synthetic resin material, (b) an electrically conductive metal hub integrally molded with said disc and adapted to be mounted in electrical connection with said spindle for rotation therewith, (c) a plurality of electrically conductive metal spokes integrally molded within said disc and bonded at one end to said hub and extending radially therefrom, (d) an electrically conductive working member integrally molded upon the outer diameter of said disc, said working member comprising (i) a matrix of sintered metal, and
   (ii) diamond grit particles partially embedded in the working surface of said matrix, and (e) an electrically conductive sintered metal inset integrally molded within said disc, said inset having a trapezoidal cross-section and bonded at its back portion to said spokes and at its front portion to said working member.

5. A machining wheel comprising (a) a disc formed substantially of a dielectric synthetic resin material, (b) an electrically conductive metal hub integrally molded with said disc and adapted to be mounted upon a spindle for rotation therewith, (c) a plurality of electrically conductive metal spokes integrally molded within said disc and bonded at one end to said hub and extending radially therefrom, and (d) an electrically conductive working member integrally molded upon the outer diameter of said disc and bonded to the outer ends of said spokes, said working member comprising (i) a matrix of sintered metal,
   (ii) diamond grit particles partially embedded in the working surface of said matrix, and
   (iii) a sintered metal inset portion of trapezoidal cross section wider at its back portion.

6. A machining wheel comprising (a) a disc formed substantially of a dielectric synthetic resin material, (b) an electrically conductive metal hub integrally molded with said disc and adapted to be mounted in electrical connection with a metal spindle for rotation therewith, (c) a plurality of electrically conductive metal spokes integrally molded within said disc and bonded at one end to said hub and extending radially therefrom, (d) an electrically conductive working member integrally molded upon the outer diameter of said disc, said working member comprising (i) a matrix of sintered metal, and
   (ii) diamond grit particles partially embedded in the working surface of said matrix, and (e) an electrically conductive sintered metal inset integrally molded within said disc, said inset having a trapezoidal cross-section and bonded at its back portion to said spokes and at its front portion to said working member.

References Cited by the Examiner

UNITED STATES PATENTS

| | | | |
|---|---|---|---|
| 2,871,177 | 1/1959 | Comstock | 204—143 |
| 3,108,941 | 10/1963 | Landeck | 204—143 |
| 3,238,114 | 3/1966 | Halverstadt et al. | 204—224 |
| 3,268,434 | 8/1966 | Weingartner | 204—224 |

FOREIGN PATENTS 1,219,463  12/1959  France.

JOHN M. MACK, *Primary Examiner.*

R. MIHALEK, *Assistant Examiner.*